(12) United States Patent
Cleveland et al.

(10) Patent No.: US 7,761,075 B2
(45) Date of Patent: Jul. 20, 2010

(54) APPARATUS AND METHOD FOR INTERFERENCE CANCELLATION IN WIRELESS MOBILE STATIONS OPERATING CONCURRENTLY ON TWO OR MORE AIR INTERFACES

(75) Inventors: Joseph R. Cleveland, Murphy, TX (US); Seong Eun Kim, Plano, TX (US); Lup M. Loh, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1337 days.

(21) Appl. No.: 11/232,346

(22) Filed: Sep. 21, 2005

(65) Prior Publication Data

US 2007/0066226 A1 Mar. 22, 2007

(51) Int. Cl.
H04B 1/10 (2006.01)
H04B 1/06 (2006.01)
H04B 7/00 (2006.01)
H03D 1/04 (2006.01)
H03D 1/06 (2006.01)
H03K 5/01 (2006.01)
H03K 6/04 (2006.01)
H04L 1/00 (2006.01)
H04L 25/08 (2006.01)

(52) U.S. Cl. ............... 455/296; 455/222; 455/278.1; 375/346; 370/317

(58) Field of Classification Search .............. 455/550.1, 455/553.1, 562.1, 570, 575.7, 222, 279.1, 455/278.1, 283, 296; 370/317; 375/346
See application file for complete search history.

(56) References Cited

U.S. PATENT DOCUMENTS

| | | | | |
|---|---|---|---|---|
| 5,068,667 A | * | 11/1991 | Mizoguchi | 342/362 |
| 5,568,158 A | * | 10/1996 | Gould | 343/756 |
| 5,712,641 A | * | 1/1998 | Casabona et al. | 342/362 |
| 6,025,816 A | | 2/2000 | Dent et al. | |
| 6,097,943 A | * | 8/2000 | Nordwall | 455/418 |
| 6,334,048 B1 | | 12/2001 | Edvardsson et al. | |
| 6,369,761 B1 | | 4/2002 | Thiam et al. | |
| 6,937,206 B2 | | 8/2005 | Puente Baliarda et al. | |
| 7,038,628 B1 | * | 5/2006 | Rausch | 343/702 |
| 7,123,941 B2 | * | 10/2006 | Fukuhara et al. | 455/562.1 |
| 7,203,519 B2 | * | 4/2007 | Ylitalo | 455/562.1 |
| 7,349,505 B2 | * | 3/2008 | Blount et al. | 375/346 |
| 7,353,013 B2 | * | 4/2008 | Qi et al. | 455/278.1 |
| 7,493,143 B2 | * | 2/2009 | Jalali | 455/562.1 |
| 2004/0132414 A1 | * | 7/2004 | Sendyk et al. | 455/73 |
| 2004/0219959 A1 | * | 11/2004 | Khayrallah et al. | 455/575.7 |
| 2005/0057417 A1 | | 3/2005 | Teillet et al. | |
| 2006/0128336 A1 | * | 6/2006 | Waltman et al. | 455/273 |
| 2007/0117522 A1 | * | 5/2007 | Axness et al. | 455/78 |

* cited by examiner

Primary Examiner—Nay A Maung
Assistant Examiner—Andrew Wendell

(57) ABSTRACT

An apparatus and method for interference cancellation in wireless mobile stations operating concurrently in two or more wireless modes.

20 Claims, 5 Drawing Sheets

US 7,761,075 B2

APPARATUS AND METHOD FOR INTERFERENCE CANCELLATION IN WIRELESS MOBILE STATIONS OPERATING CONCURRENTLY ON TWO OR MORE AIR INTERFACES

TECHNICAL FIELD OF THE INVENTION

The present application relates generally to wireless networks and, more specifically, to an apparatus and method for interference cancellation.

BACKGROUND OF THE INVENTION

This application provides an apparatus and method for the reduction of blocking signals that occur in concurrent mode operation when a mobile station operates with two different air interfaces on different carriers within the same RF band. The increasing plurality of air interfaces worldwide creates the expectation that a mobile station would be able to operate concurrently with two or more air interfaces, referred to as concurrent multimode operation. Concurrent operation consists of a terminal operating with a voice or data call on one air interface (or mode of wireless communication), such as GSM, while scanning for access control signals (e.g., pilot channel signals, access channel signals, paging channel signals, and the like) from a second air interface in the same band, such as WCDMA, or vice versa. This allows a mobile station to optimize its performance over the available communications channel based on which air interface provided the optimum quality of service (QoS).

Concurrent multimode operation also allows the terminal to switch to a different standard in situations where low signal levels exist on one air interface (mode) but not another. Typically, the first and second air interfaces are supported by different base stations, but they could be supported in a single base station structure. The consequence of dual mode operation, however, is that the input to the receiver stage operating in a scanning mode for a second air interface may experience a strong blocking signal. For example, the transmit level for GSM ranges from +24 dBm to +30 dBm. For WCDMA terminals the maximum expected blocking level at the antenna input is −25 dBm. Because of the high blocking level, a conventional multi-mode mobile station is often unable to adequately scan or communicate in the second mode while the first mode is active.

Therefore, there is a need in the art for an improved apparatus and method for interference cancellation in wireless mobile stations operating concurrently on two or more air interfaces.

SUMMARY OF THE INVENTION

A method for interference cancellation in a mobile station is provided. The method comprises communicating in a first mode of wireless communication using a first antenna having a first polarization; communicating in a second mode of wireless communication using a second antenna having a second polarization that is orthogonal to the first polarization, concurrent with communicating in the first mode of wireless communication; and performing an interference cancellation process between the communication in the first mode of wireless communication and the communication in the second mode of wireless communication.

A mobile station capable of communicating in a wireless network is also provided. The mobile station comprises a first antenna having a first polarization; a second antenna having a second polarization, wherein the second polarization is orthogonal to the first polarization; and a processor, wherein the mobile station is configured to communicate in a first mode of wireless communication using the first antenna; communicate in a second mode of wireless communication using the second antenna, concurrent with communicating in the first mode of wireless communication; and perform an interference cancellation process between the communication in the first mode of wireless communication and the communication in the second mode of wireless communication.

Another mobile station capable of communicating in a wireless network is also provided. The mobile station comprises a first antenna having a first polarization for receiving a first wireless signal; a second antenna having a second polarization for receiving a second wireless signal, wherein the second polarization is orthogonal to the first polarization; and an interference cancellation stage, connected to the first and second antennas to receive signals corresponding to the first and second wireless signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The apparatus and method disclosed herein use antenna cross-polarization, signal cancellation, and digital processing techniques to reduce or eliminate the interference caused by a first signal transmitted by a first air interface, operating in a first mode of wireless communication, in the receiver circuits of a second air interface, operating in a second mode of wireless communication.

Figure 1:
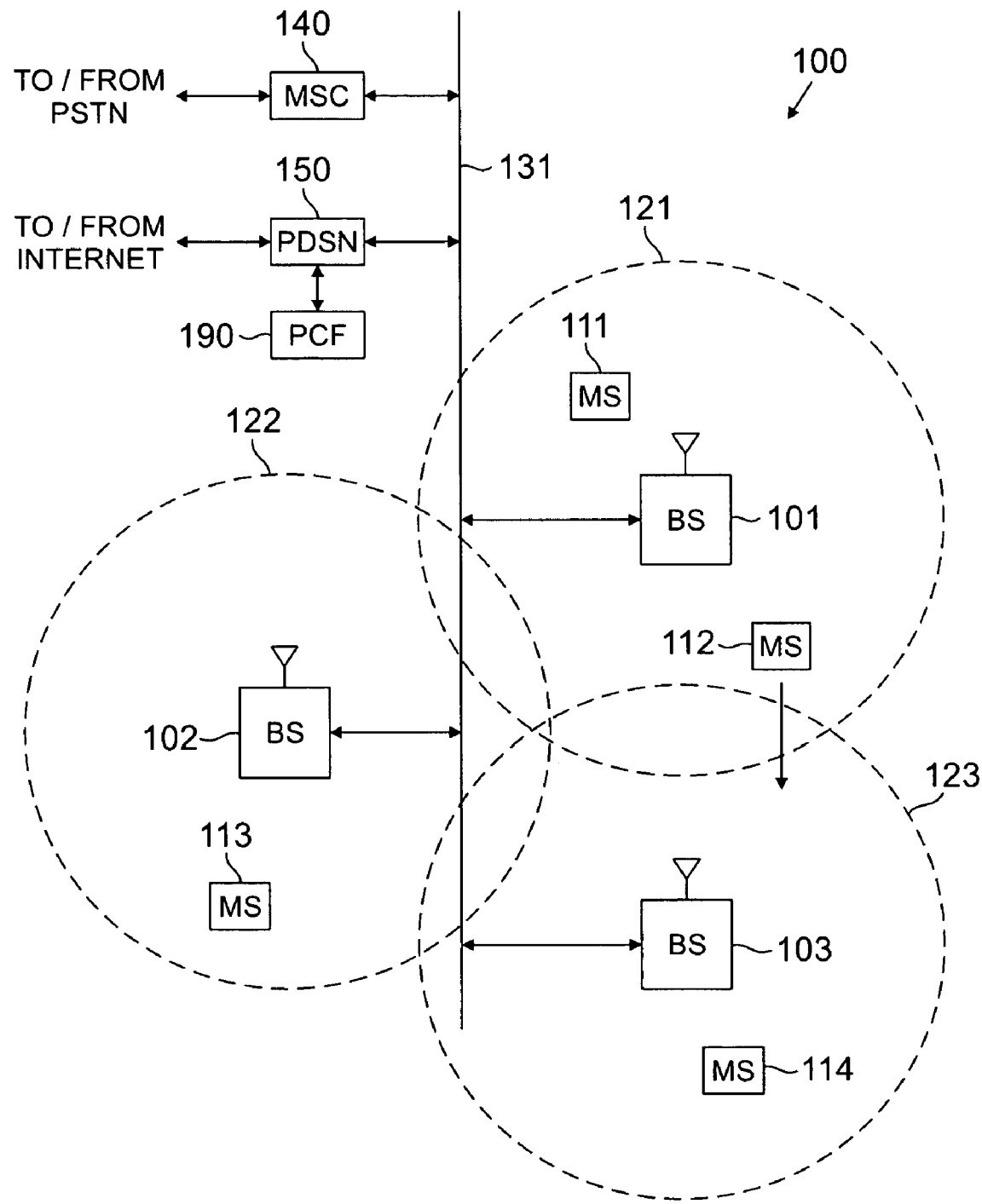
FIG. 1 illustrates an exemplary wireless network, in which a plurality of modes of operation are supported among one or more base stations.

FIG. 1 illustrates exemplary wireless network 100, in which a plurality of modes of operation are supported among one or more base stations. Wireless network 100 comprises a plurality of cells (or cell sites) 121-123, each containing one of the base stations, BS 101, BS 102, or BS 103. Base stations 101-103 communicate with a plurality of mobile stations (MS) 111-114 in various operational modes, which can include but are not limited to GSM, TDMA, CDMA, WCDMA, OFDMA, WMAN and other telecommunications protocols known to those of skill in the art. In an advantageous embodiment of the present disclosure, mobile stations 111-114 are capable of receiving data traffic and/or voice traffic in two or more modes simultaneously, as described more fully below. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals, all of which are intended to be broadly described as "mobile stations." For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability). For example, the term "mobile station" may be used herein to refer to entities that are known or referred to as "subscriber stations" in some standards, including, for example, the IEEE-802.16 wireless metropolitan area network (WMAN) standard.

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network.

A base transceiver subsystem comprises the RF transceivers, antennas, and other electrical equipment located in a cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

Of course, in other embodiments, base stations 101-103 can operate in other modes of operation, such as OFDMA, that include or omit various elements of the exemplary wireless network, base station, and mobile station described herein. For purposes of illustration herein, BS 101 operates in a first mode of wireless communication, e.g. GSM, and BS 103 operates in a second mode of wireless communication, e.g. WCDMA.

BS 101, BS 102 and BS 103, in this exemplary embodiment, transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Communication line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile station in a wireless network and external networks, such as the PSTN or Internet. MSC 140 is well known to those skilled in the art. In some embodiments of the present disclosure, communication line 131 may be several different data links where each data link couples one of BS 101, BS 102, or BS 103 to MSC 140.

In the exemplary wireless network 100, MS 111 is located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell 123, as indicated by the direction arrow proximate MS 112. At some point, as MS 112 moves into cell 123 and out of cell 121, a hand-off will occur.

In an exemplary embodiment, MS 112 is a multi-mode mobile station, as described more fully below. As shown in FIG. 1, MS 112 is in active communication with BS 101, in a first mode of wireless communication, while scanning in a second mode of wireless communication for BS 103. When MS 112 prefers the alternate service, protocol, or standard provided by BS 103, for a better quality of service (QoS), MS 112 may switch to active communication with BS 103 in the second mode of wireless communication and to scanning in the first mode of wireless communication with BS 101.

Figure 2:
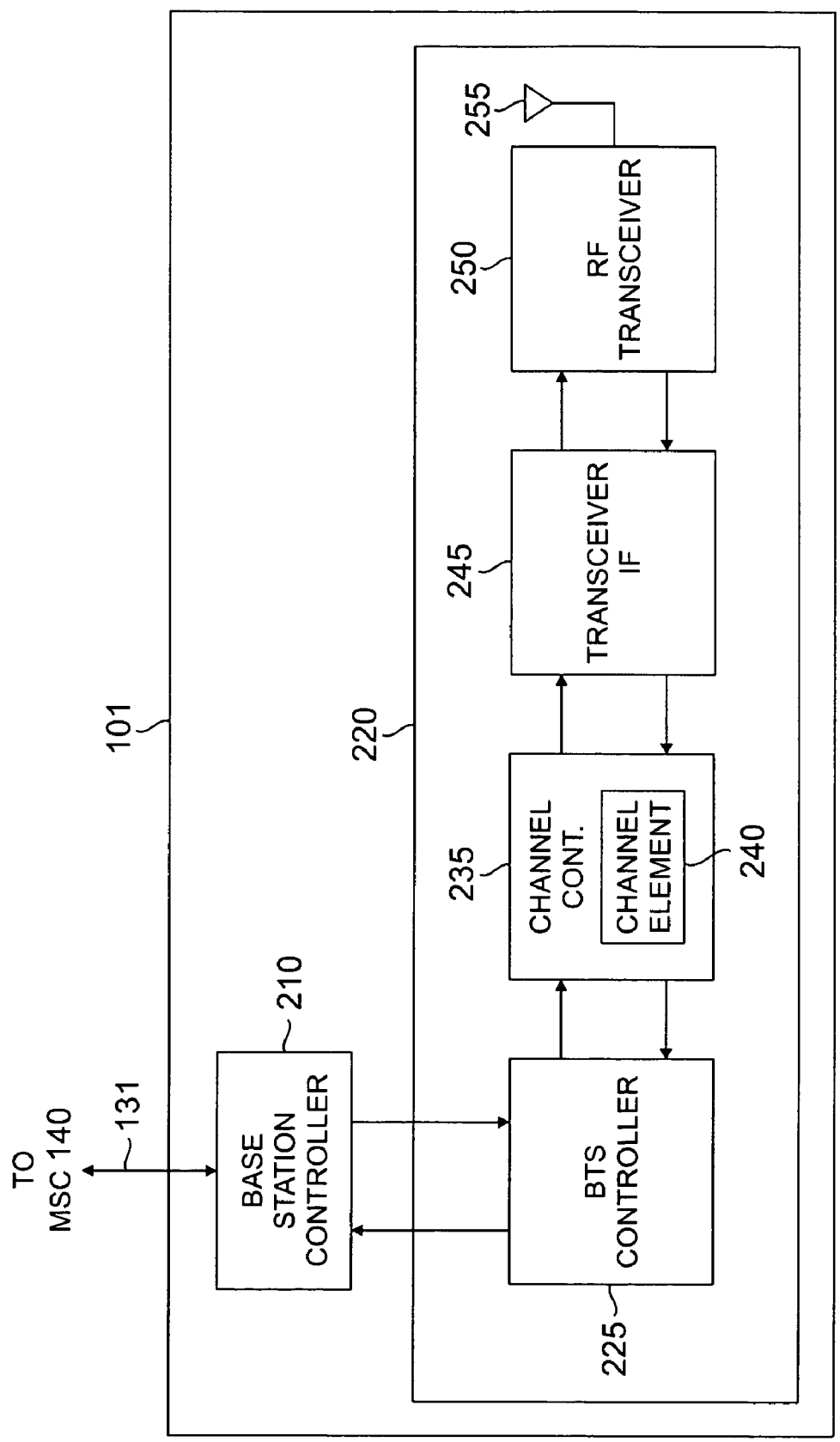
FIG. 2 illustrates an exemplary base station in greater detail according to an exemplary embodiment of the present disclosure.

FIG. 2 illustrates exemplary base station (BS) 101 in greater detail according to an exemplary embodiment of the present disclosure. Base stations 102 and 103 may be similarly structured, or may vary according to the wireless mode(s) of operation they support, as known to those of skill in the art.

In the illustrated example, base station 101 comprises base station controller (BSC) 210 and base transceiver station (BTS) 220. Base station controllers and base transceiver stations were described previously in connection with FIG. 1. BSC 210 manages the resources in cell 121, including BTS 220. BTS 220 comprises BTS controller 225, channel controller 235 (which contains representative channel element 240), transceiver interface (IF) 245, RF transceiver 250, and antenna array 255.

BTS controller 225 comprises processing circuitry and memory capable of executing an operating program that controls the overall operation of BTS 220 and communication with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 235 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present disclosure, antenna array 255 is multi-sector antenna, such as a three-sector antenna in which one or more antenna elements in each antenna sector are responsible for transmitting and receiving in a 120 degree arc of coverage area. Additionally, RF transceiver 250 may contain an antenna selection unit to select among different antenna elements in antenna array 255 during both transmit and receive operations.

Figure 3:
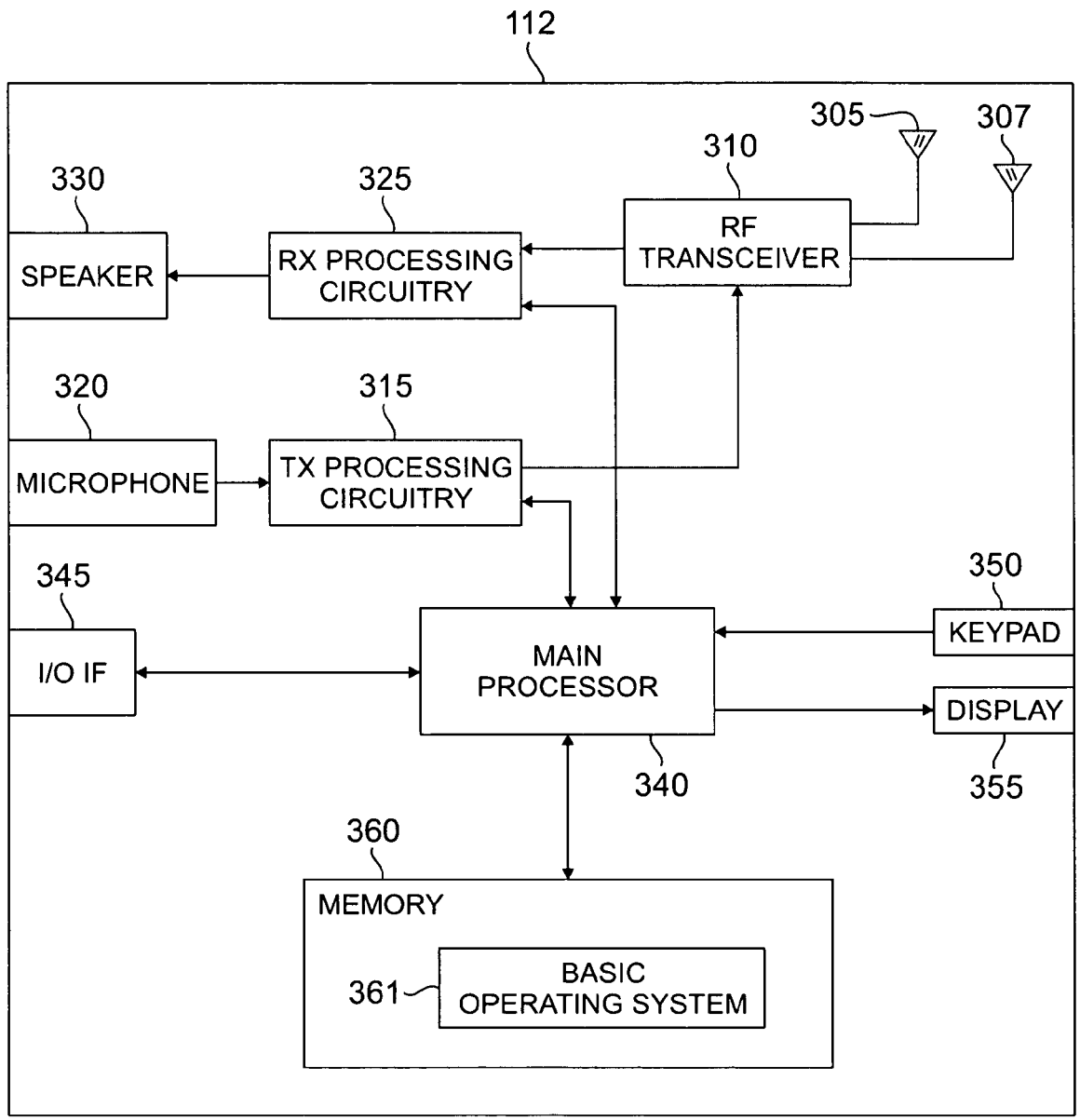
FIG. 3 illustrates a wireless mobile station according to an advantageous embodiment of the present disclosure.

FIG. 3 illustrates mobile station (MS) 112 according to an advantageous embodiment of the present disclosure capable of performing the processes described herein. Wireless mobile station 112 comprises antenna 305 and antenna 307, radio frequency (RF) transceiver 310, transmit (TX) processing circuitry 315, microphone 320, and receive (RX) processing circuitry 325. MS 112 also comprises speaker 330, main processor 340, input/output (I/O) interface (IF) 345, keypad 350, display 355, and memory 360. Memory 360 further comprises basic operating system (OS) program 361.

Radio frequency (RF) transceiver 310 receives from antennas 305 and 307 incoming RF signals transmitted by one or more base stations of wireless network 100. In an exemplary embodiment, antenna 305 receives a first RF signal according to a first mode of wireless communication, and antenna 307 receives a second RF signal according to a second mode of wireless communication. Further, antenna 305 and antenna 307 are orthogonally polarized with respect to each other. The symbol (//) indicates one polarization for antenna 305 and corresponds to the first mode of wireless communication, and the symbol (\\) indicates the orthogonal polarization for antenna 307 and corresponds to the second mode of wireless communication. Antenna 305 and antenna 307 may each be a single antenna operable for both transmit and receive operations, or may include separate transmit and receive antennas.

Radio frequency (RF) transceiver 310, described more fully below, down-converts the incoming RF signal from each antenna 305, 307 to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) for audio input or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305 and/or 307.

In an advantageous embodiment of the present disclosure, main processor 340 is a microprocessor or microcontroller. Memory 360 is coupled to main processor 340. According to an advantageous embodiment of the present disclosure, part of memory 360 comprises a random access memory (RAM) and another part of memory 360 comprises a non-volatile memory, such as Flash memory, that operates as a read-only memory (ROM).

Main processor 340 executes basic operating system (OS) program 361 stored in memory 360 in order to control the overall operation of wireless mobile station 112. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 transfers data into or out of memory 360, as required by an executing process. Main processor 340 is also coupled to I/O interface 345. I/O interface 345 provides mobile station 112 with the ability to connect to other devices, such as laptop computers and handheld computers. I/O interface 345 is the communication path between these accessories and main controller 340.

Main processor 340 is also coupled to keypad 350 and display unit 355. The operator of mobile station 112 uses keypad 350 to enter data into mobile station 112. Display 355 may be a liquid crystal display capable of rendering text and/or at least limited graphics from web sites. Alternate embodiments may use other types of displays.

Figure 4:
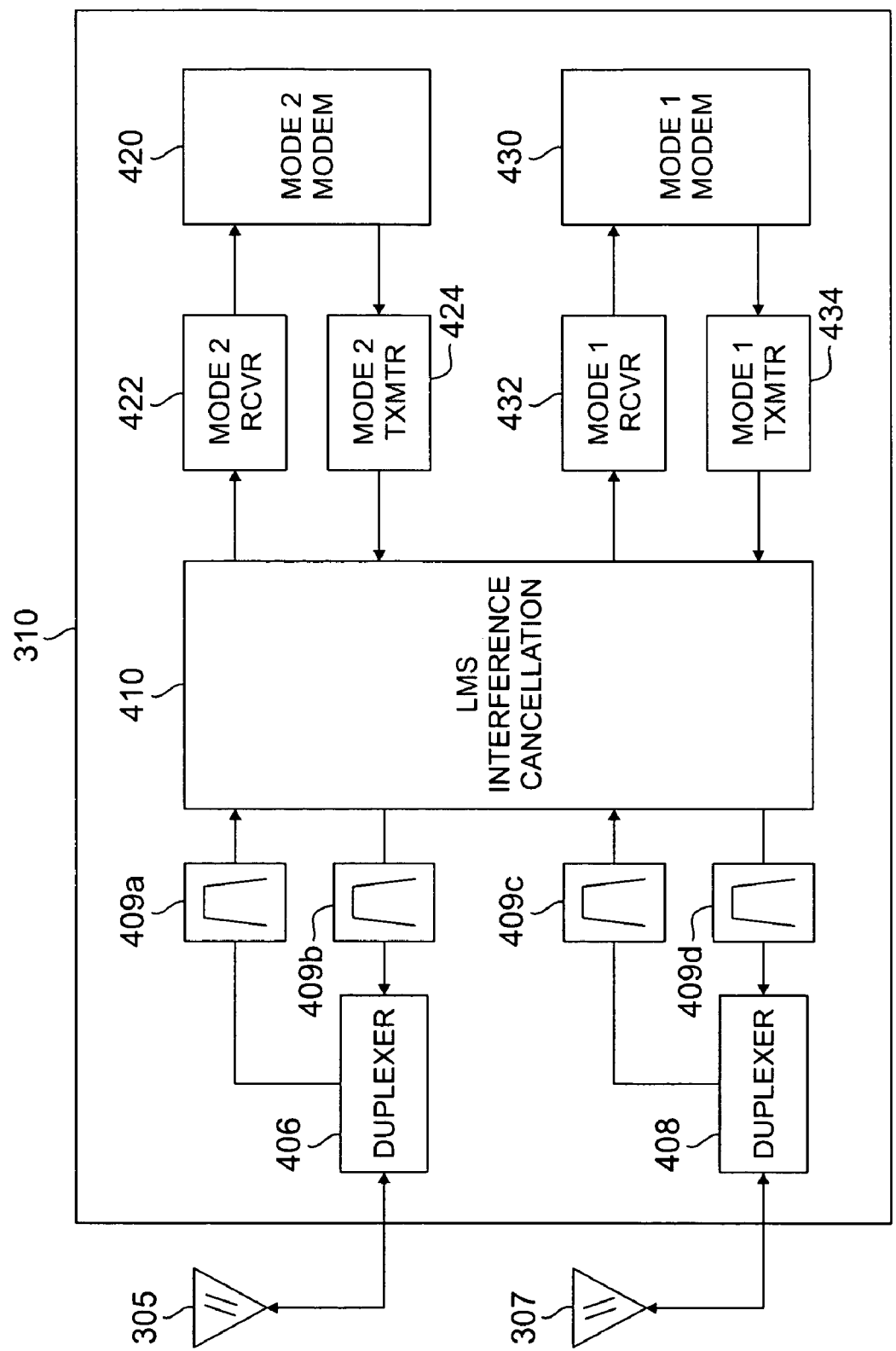
FIG. 4 illustrates a reference architecture for an RF transceiver with interference cancellation in accordance with an exemplary embodiment of the present disclosure.

FIG. 4 illustrates a reference architecture for RF transceiver 310 of multimode mobile station (MS) 112, including interference cancellation in accordance with an exemplary embodiment of the present disclosure. This embodiment uses two techniques in tandem to suppress any interfering signals coupled between transmit and receive antennas: (1) orthogonally polarized antennas 305 and 307 as depicted in FIG. 3, to minimize transmit-to-receive coupling between signals for different modes; and (2) digital signal processing, including least-mean-squares (LMS) interference cancellation 410, to suppress coupled signals. In FIG. 4, the symbol (\\) indicates one polarization and the symbol (//) indicates the orthogonal polarization.

In one configuration, MS 112 has a call in progress in a first mode (Mode 1) and scans in a second mode (Mode 2) for access control signals (e.g., pilot channel signals, access channel signals, paging channel signals, and the like). In other configurations, MS 112 actively communicates concurrently in both Mode 1 and Mode 2, which is particularly advantageous, for example, for a voice call in one mode while using a data connection for internet access in the other mode. The LMS interference cancellation 410 samples the transmitted Mode 1 signal to obtain a transmitted signal replica to perform the cancellation.

Other portions of the architecture illustrated in this block diagram, including duplexers 406 and 408, filters 409a-409d, Mode 2 modem 420, Mode 2 receiver circuitry 422, Mode 2 transmitter circuitry 424, Mode 1 modem 430, Mode 1 receiver circuitry 432, and Mode 1 transmitter circuitry 434 may be implemented using conventional techniques known to those of skill in the art.

Figure 5:
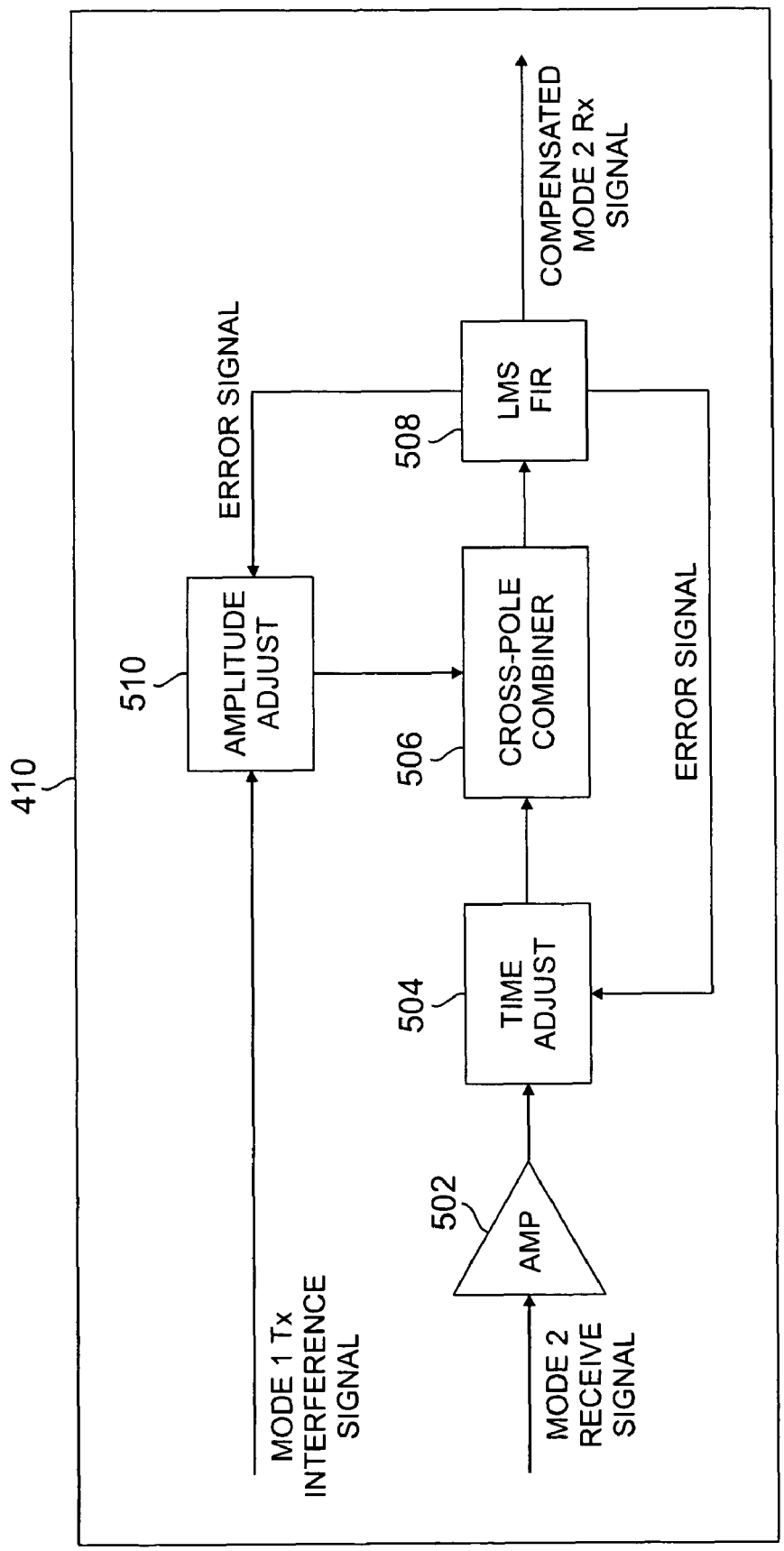
FIG. 5 depicts a block diagram of a cross-pole interference canceller in accordance with an exemplary embodiment of the present disclosure.

FIG. 5 depicts a block diagram of a cross-pole interference canceller in accordance with an exemplary embodiment of the present disclosure, which can be used to implement the LMS interference cancellation 410. A digital processing stage, including amplifier 502, time adjust circuit 504, amplitude adjust circuit 510, and least mean square (LMS) finite impulse response (FIR) processor 508, adjusts the relative amplitude and time delay between an interference signal transmitted by one antenna (e.g., Mode 1 antenna) and the received signal from the other antenna (e.g., Mode 2 antenna). The matched interference signal from one antenna is then subtracted from the signal received by the other antenna by cross-pole combiner 506, thereby reducing any interference terms.

LMS FIR processor 508 determines the time delay (equivalent filter tap) and relative amplitude of interference signals. LMS FIR processor 508 provides error signals that adjust time delay and amplitude values for the reference signals in order to cancel one or more interference signals. The amplitude of the Mode 1 transmission interference signal can be adjusted, according to the error signal from LMS FIR processor 508, by amplitude adjust circuit 510. For multiple signals with different amplitudes and time delays, the signal processor uses a replica of the strongest signal received and adapts the relative amplitudes in different time slots to result in cancellation of interfering signal.

In the illustrated embodiment, the digital processing stage cancels the Mode 1 interference signal from the Mode 2 received signal. A second and similar digital processing stage may be used to cancel the Mode 2 interference signal from the Mode 1 received signal.

One skilled in the art may employ modeling tools, such as the Numerical Electromagnetic Code (NEC), to analyze the isolation provided by different cross-polarized antenna configurations operating in the near-field zone. For example, one or more fractal antenna designs may be evaluated as a possible implementation of the antenna array 255. Fractal antennas have been found to provide good efficiency, large bandwidth (up to 15:1 tuning range), and good front-back ratios.

The disclosed embodiments are particularly useful in markets served by multiple air interfaces that operate in the same frequency bands such as the cellular band (800 MHz), PCS band (1800/1900 MHz), WCDMA band (2100 MHz), and MMDS bands. This includes, but is not limited to, CDMA2000, GSM, WCDMA, IEEE-802.16e air interface modes.

The preferred embodiments, as described herein, have the particular advantage that they do not require components with high insertion losses. These embodiments offer the means to achieve the desired rejection without high-cost components. Furthermore, they use processing techniques that can be hosted on silicon-based processors.

Alternate embodiments include reconfigurable filters, modems, and digital receivers for adaptation to different combinations of modes or air interfaces. Those of skill in the art will also recognize that the structure and elements comprising the exemplary wireless network, base stations, mobile stations, and other devices and systems described herein can vary according to the wireless communication modes supported and other technological and commercial objectives, without departing from the scope of the claims below.

Although the present disclosure has been described with exemplary embodiments, various changes and modifications may be suggested to one skilled in the art. It is intended that the present disclosure encompass such changes and modifications that fall within the scope of the appended claims.

What is claimed is:

1. A method for interference cancellation in a mobile station, comprising:
    communicating in a first mode of wireless communication using a first antenna having a first polarization;
    communicating in a second mode of wireless communication using a second antenna having a second polarization, concurrent with communicating in the first mode of wireless communication, wherein the second polarization is orthogonal to the first polarization; and
    performing an interference cancellation process between the communication in the first mode and the communication in the second mode, wherein the interference cancellation process includes using a least mean square finite impulse response processor.

2. The method of claim 1, wherein the interference cancellation process further includes subtracting signals in a cross-pole combiner, the signals corresponding to the first and second modes of communication.

3. The method of claim 1, wherein the interference cancellation process further includes digitally combining the communications in the first and second modes to remove interfering and blocking signals.

4. The method of claim 1, wherein the interference cancellation process further includes adjusting a signal strength of at least one of: the communication in the first mode and the communication in the second mode.

5. The method of claim 1, wherein the first mode of wireless communication and the second mode of wireless communication are each selected from the group consisting of CDMA2000, 1XEV/DO, WCDMA, GSM and IEE802.16e.

6. The method of claim 1, wherein the first mode of wireless communication and second mode of wireless communication are in the same frequency band.

7. The method of claim 1, wherein the interference cancellation process further includes adjusting a time delay of at least one of: the communication in the first mode and the communication in the second mode.

8. A mobile station capable of communicating in a wireless network, comprising:
a first antenna having a first polarization;
a second antenna having a second polarization, wherein the second polarization is orthogonal to the first polarization; and
a processor,
wherein the mobile station is configured to:
communicate in a first mode of wireless communication using the first antenna;
communicate in a second mode of wireless communication using the second antenna, concurrent with communicating in the first mode of wireless communication; and
perform an interference cancellation process between the communication in the first mode and the communication in the second mode, wherein the interference cancellation process includes using a least mean square finite impulse response processor.

9. The mobile station of claim 8, wherein the interference cancellation process further includes subtracting signals in a cross-pole combiner, the signals corresponding to the first and second modes of communication.

10. The mobile station of claim 8, wherein the interference cancellation process further includes digitally combining the communications in the first and second modes to remove interfering and blocking signals.

11. The mobile station of claim 8, wherein the interference cancellation process further includes adjusting a signal strength of at least one of: the communication in the first mode and the communication in the second mode.

12. The mobile station of claim 8, wherein the first mode of wireless communication and second mode of wireless communication are each selected from the group consisting of CDMA2000, 1XEV/DO, WCDMA, GSM and IEEE802.16e.

13. The mobile station of claim 8, wherein the first mode of wireless communication and second mode of wireless communication are in the same frequency band.

14. The mobile station of claim 8, wherein the interference cancellation process further includes adjusting a time delay of at least one of: the communication in the first mode and the communication in the second mode.

15. A mobile station capable of communicating in a wireless network, comprising:
a first antenna having a first polarization for receiving a first wireless signal;
a second antenna having a second polarization for receiving a second wireless signal, wherein the second polarization is orthogonal to the first polarization; and
an interference cancellation stage connected to the first and second antennas to receive signals corresponding to the first and second wireless signals, the interference cancellation stage including a least mean square finite impulse response processor.

16. The mobile station of claim 15, wherein the interference cancellation stage further includes an amplitude adjust circuit.

17. The mobile station of claim 15, wherein the interference cancellation stage further includes an amplifier for adjusting the signal strength of at least one signal.

18. The mobile station of claim 15, wherein the interference cancellation stage further includes a time adjust circuit to adjust the time delay of at least one signal.

19. The mobile station of claim 15, wherein the interference cancellation stage further includes a cross-pole combiner to subtract signals corresponding to the first and second wireless signals.

20. The mobile station of claim 15, wherein the first and second wireless signals are in the same frequency band.

* * * * *